United States Patent [19]
Dove et al.

[11] Patent Number: 4,809,434
[45] Date of Patent: Mar. 7, 1989

[54] HAND HELD PORTABLE FACING DEVICE

[75] Inventors: W. Earl Dove; E. Ray Cotten, both of McMinnville, Tenn.

[73] Assignee: Rayco, Inc., McMinnville, Tenn.

[21] Appl. No.: 92,064

[22] Filed: Sep. 2, 1987

[51] Int. Cl.$^4$ .............................................. B26B 3/00
[52] U.S. Cl. ...................................... 30/140; 30/475; 30/478
[58] Field of Search ............... 30/14 D, 114, 116, 475, 30/478, 480, 482; 83/171, 651.1

[56] References Cited

U.S. PATENT DOCUMENTS

| | | | |
|---|---|---|---|
| 2,987,598 | 6/1961 | Chace et al. | 219/19 |
| 3,055,251 | 9/1962 | Krikorian | 83/587 |
| 3,199,388 | 8/1965 | Redfield | 83/16 |
| 3,277,754 | 10/1966 | Lopez | 83/4 |
| 3,381,449 | 5/1968 | Vaughan | 53/390 |
| 3,459,083 | 8/1969 | Bennis | 83/171 |
| 4,206,668 | 6/1980 | Creech | 83/171 |

FOREIGN PATENT DOCUMENTS 1021292  3/1966  United Kingdom ............... 30/140

Primary Examiner—Douglas D. Watts
Attorney, Agent, or Firm—Luedeka, Hodges & Neely

[57] ABSTRACT

The specification discloses a hand held portable facing device to be used primarily for facing polystyrene building panels after installation. The facing device is constructed of a frame, a wire planing element, and tension arms which mount on the frame for keeping the planing element taut. The facing device incorporates an electrical power system which conducts electrical current from an external source, through an electrical power unit, through a safety switch, through the wire planing element, to the frame and earth ground which are electrically interconnected. The current flow heats the wire planing element and enables it to shear a flat polystyrene panel. Guide arms capable of resting on and following the flat panel are incorporated into the frame, and the tension arms and wire planing element are so attached to the guide arms that the wire planing element follows the path of the guide arms leaving a flat smooth surface.

10 Claims, 7 Drawing Sheets

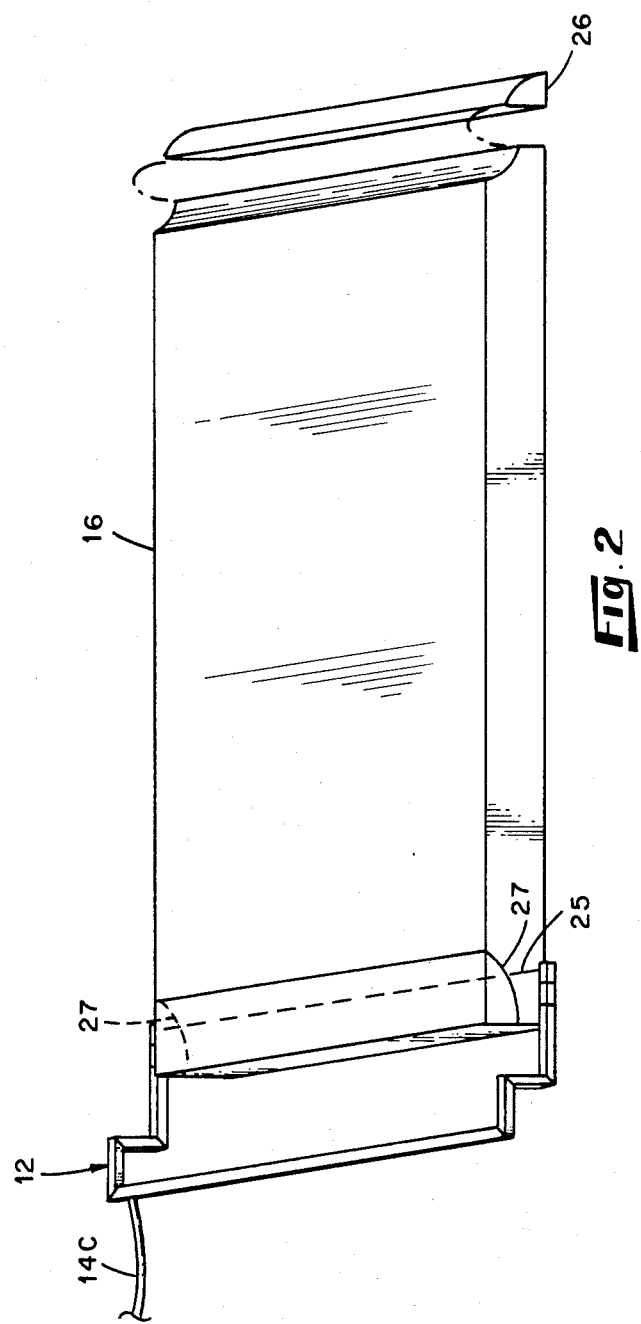

HAND HELD PORTABLE FACING DEVICE

FIELD OF THE INVENTION

The present invention relates to devices designed to cut materials which are susceptible to heat shearing and more particularly to devices designed to cut polystyrene.

BACKGROUND AND SUMMARY OF THE INVENTION

Plastics, particularly polystyrene, are used in the building industry as sheet insulation. Lately, major building projects have used the polystyrene, subject to certain sealing and decorative finishes, as a finished interior or exterior wall. Dryvit Systems, Inc., under the trade name "Dryvit," is an example of a polystyrene product used in such manner.

The polystyrene is usually furnished in 4'×8' sheets of selected thickness. It must be cut and fitted as any building material which must conform to a finite space. When in place, the exposed surface of the polystyrene at best conforms to the subsurface to which it is attached; therefore, the polystyrene requires surface preparation such as planing and trimming before the final finish can be applied. This planing and trimming is only feasible after the panels are permanently fixed in place; thus, any tool which performs the required planing and trimming must be hand held, light, and portable enough for use by one workman.

Heretofore, the typical tool available which was light, portable, hand held, and capable of suitably shaping a polystyrene block was a sanding block and coarse grit sandpaper. Such a process was slow, expensive, and often left a rough surface to receive the final finish. The present invention provides a smooth sheared surface quickly at minimal expense. In addition, the tool is versatile enough to be used as a fitting tool for initial installation of the polystyrene blocks and it can even be used to make decorative cuts.

In accordance with the present invention, an external power source and earth ground are utilized such as are commonly found in household outlets. An electrical power unit converts incoming electrical energy to a safe, low voltage, limited amperage output. Output flows by means of one leg of a power cord to a safety switch mounted on the frame of the planing device. When engaged the safety switch allows current flow through a conductive planing element of selected resistance so that the element heats. Current flows from the planing element to the frame and handles of the planing device and to earth ground through another leg of the power cord so that at any time the device is in use an operator is protected from electrical shock.

The planing element is mounted between two tension arms which maintain such tension in the planing element that it is able to slice through a heat shearable workpiece while maintaining the configuration of a line segment. A pair of guide arms capable of following the general surface of the workpiece also serve as mounts for the tension arms which in turn serve as mounts for the planing element so that the planing element normally operates in the same general plane as the surface of the workpiece. Offsetting arms, one for each guide arm, provide a means of offsetting the frame upward from the surface of the workpiece so that a handle mounted to the frame rests a comfortable working distance from the surface of the workpiece. One configuration utilizes an adjustable frame to allow variation in the length of the planing element.

The advantages and further aspects of the present invention will be readily appreciated by those of ordinary skill in the art as the same becomes better understood by reference to the following detailed description when considered in conjunction with the accompanying drawings.

BRIEF DESCRIPTION OF THE DRAWINGS

FIG. 2 is a perspective view showing the ability of the device to make decorative cuts when used freehand.

DETAILED DESCRIPTION

Figure 1:
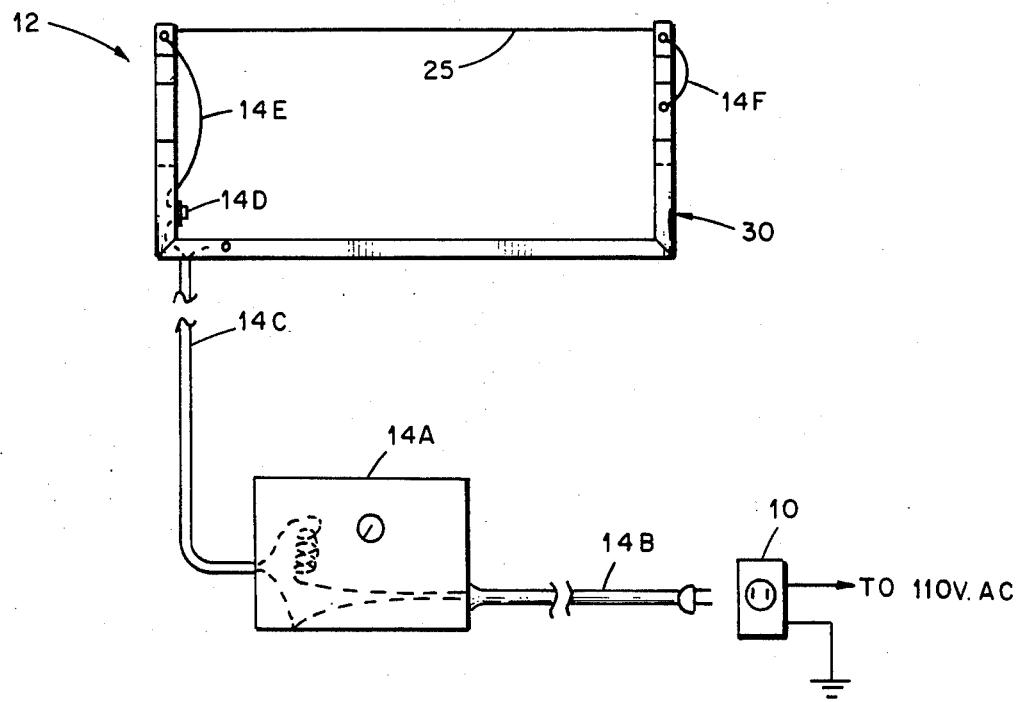
FIG. 1 is an illustration of the basic electrical elements preferred and the resulting current flow through the facing device.

Referring now to the drawings in which like reference characters refer to like or similar parts throughout the several views, there is shown in FIG. 1 a hand held portable facing device 12 embodying one form of the invention which utilizes a power system (14A-F, 25 and 30) to receive electrical energy from an external source 10, transmit it through an elongate wire planing element 25, back to earth ground. The current flow heats the elongate wire planing element 25 and enables it to shear a polystyrene workpiece (See FIGS. 2, 3 and 3A).

More specifically, the primary cord 14B conducts electrical current through a positive lead from the external source 10 to the electrical power unit 14A. A negative lead in the primary cord 14B connects the electrical power unit 14A to earth ground. In the preferred power unit 14A, the internal circuitry receives 110 volt A.C. input and provides limited amperage D.C. output. Output flows through a positive lead in the secondary cord 14C to the safety switch 14D. The safety switch 14D is of the push button type, and when engaged allows current flow from the power unit 14A, through a positive jumper wire 14E, to the positive end of the elongate wire planing element 25. Current passes through the elongate wire planing element 25 to a negative jumper wire 14F which is electrically connected to the negative end of the elongate planing element 25. The negative jumper wire 14F conducts current to the tension frame 30 which is preferably comprised of tubular aluminum. A negative lead in the secondary cord 14C is the means of electrically connecting the tension frame 30 to earth ground through the electrical power unit 14A and the negative lead in the primary cord 14B.

Referring to FIG. 2, a trim block 26 resembling a spherical wedge is shown cut from one end of a polystyrene block 16. A similar cut in progress at the opposite end of the polystyrene block 16 illustrates the method for making such a trim block. The first step is to make the pattern mark 27 to be followed by the planing element 25. Without engaging any other part of the facing device with the polystyrene block 16, the elongate planing element 25 can be moved freehand through the polystyrene block 16 along the pattern mark 27. When the elongate planing element has completely traced the pattern mark 27, a second trim block similar to trim block 26 will have been produced.

Figure 3A:
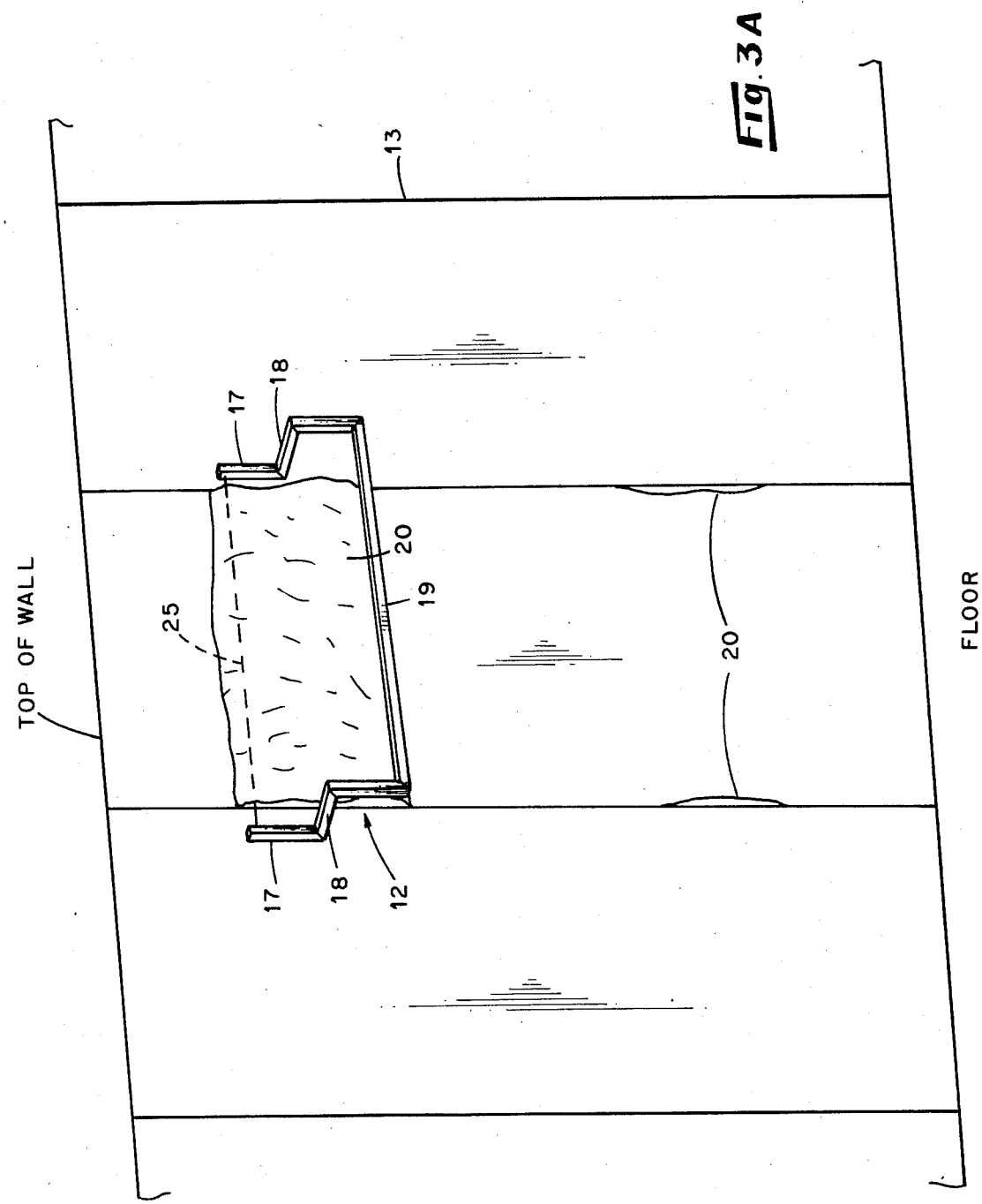
FIG. 3A is a perspective view of the facing device showing the device in use on a section of interior wall with the guide arms resting on and following the workpiece (wall section).
Figure 3B:
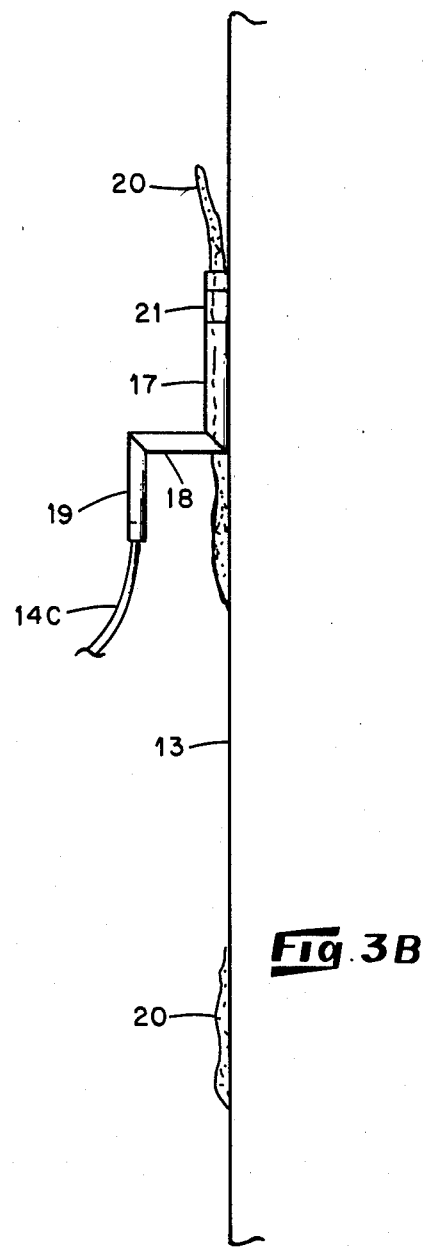
FIG. 3B is a side view of FIG. 3A.
Figure 4:
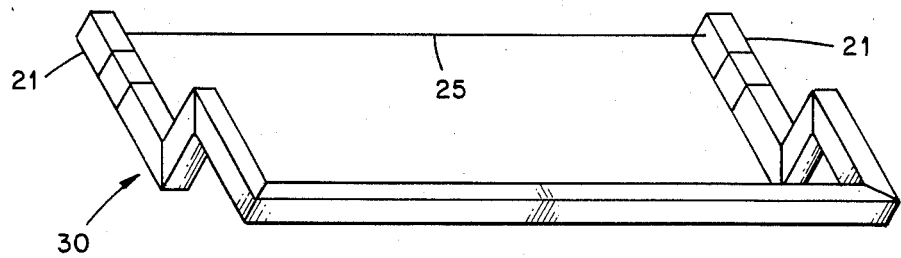
FIG. 4 is a perspective view of the nonadjustable model of the facing device.
Figure 5:
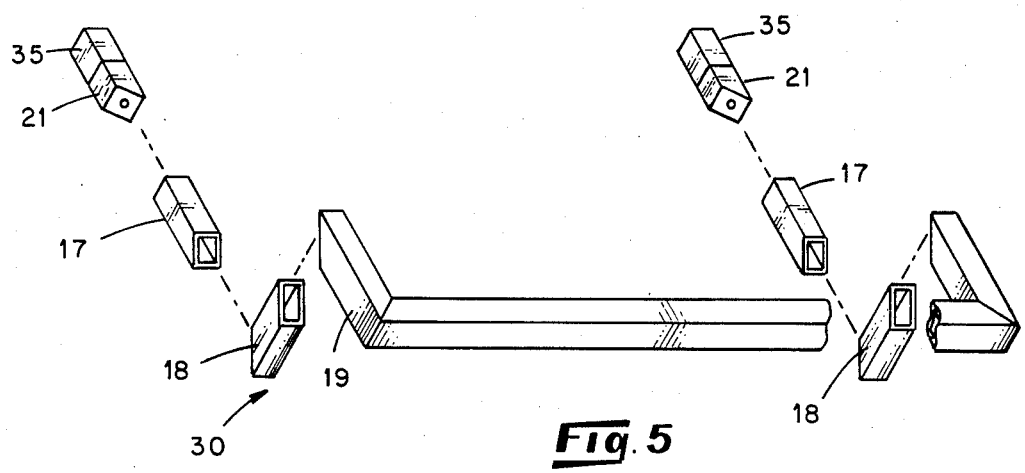
FIG. 5 is a perspective view of the major elements of the nonadjustable model of the facing device.

FIG. 3A is a perspective view of the facing device 12 planing an interior wall 13. As the tension frame 30 is pulled downward (or upward as needed), the first and second guide arms 17, having the same positional and dimensional relationship as two opposite sides of a rectangle, engage and follow the interior wall 13. The elongate wire planing element 25 being coplanar with the engaging surface of the guide arms 17, planes away undesired material 20.

Referring to FIG. 38 (a side view of FIG. 3A), in the preferred embodiment the offset arms 18, guide arms 17, and main frame 19 are comprised of square aluminum tubing. Preferably, the first offset arm 18 is welded to the first guide arm 17, and the second offset arm 18 is welded to the second guide arm 17 so that each offset arm 18 extends upwardly from the corresponding guide arm 17 generally perpendicular to the interior wall 13. Each offset arm 18 is preferably welded to the main frame 19 so that the main frame 19 rests generally parallel to the interior wall 13. The outside edge of the first offset arm 18 is coplanar with the outside edge of the first guide arm 17 and the first end of the main frame 19. The outside edge of the second offset arm 18 is coplanar with the outside edge of the second guide arm 17 and the second end of the main frame 19. The two planes described by the respective coplanar structures are parallel.

Figure 9:
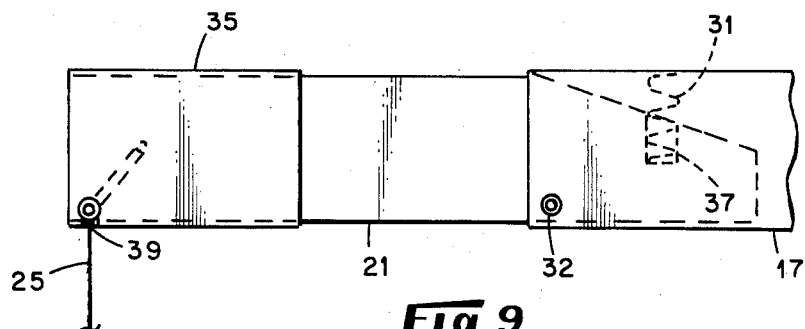
FIG. 9 is a bottom view of a tension arm, guide arm, and wire planing element as assembled.
Figure 10:
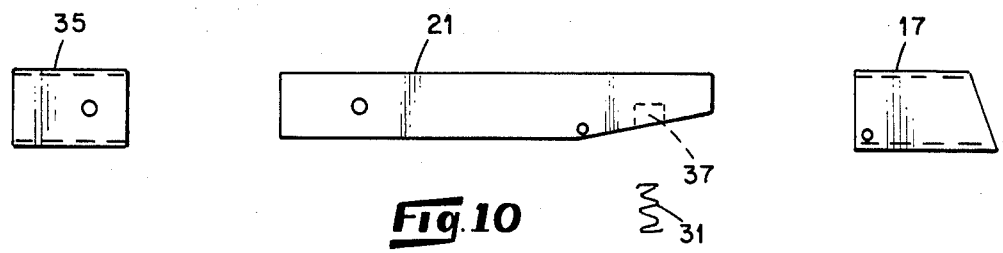
FIG. 10 is a break down top view of a tension arm, guide arm, and means for attaching the wire planing element to the tension arm.

Referring to FIGS. 4, 5, 9 and 10, the first and second resilient tension arms 21 are preferably machined from square PVC stock having dimensions of about, but less than the inside dimensions of the first and second guide arms 17. Referring to FIG. 9, the resilient tension arms 21 and the guide arms 17 have concentric cylindrical holes to receive a rocker pin 32. The outside edge of each resilient tension arm 21 is tapered so that each resilient tension arm 21 may rock inwardly toward the opposite resilient tension arm 21 when mounted inside a corresponding guide arm 17 upon the rocker pin 32. The inward rocking is resisted by a compression spring 31 which rests in a spring seat 37 in the resilient tension arm 21 and which is compressed against the inner wall of the guide arm 17.

Figure 11:
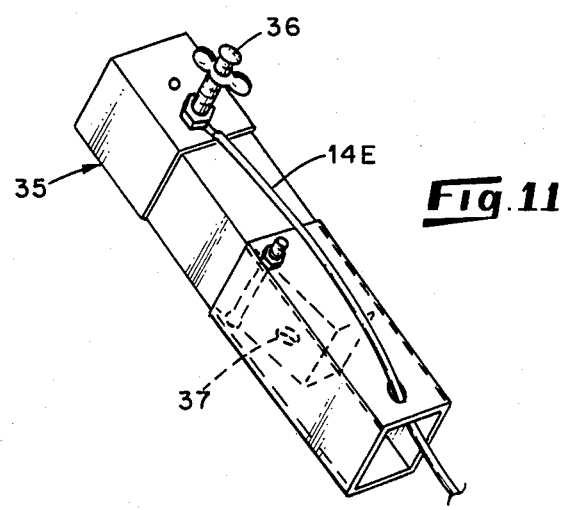
FIG. 11 is a perspective view illustrating the means for electrically connecting the planing element to the safety switch by a jumper wire.
Figure 12:
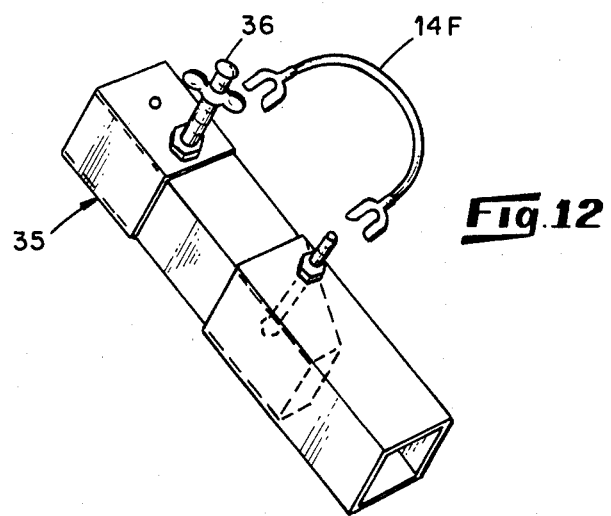
FIG. 12 illustrates means of interconnecting one end of the wire planing element, frame, and earth ground when the frame is electrically conductive.

Preferably the means for attaching the elongate wire planing element 25 to the resilient tension arms 21 comprises a pair of aluminum end caps 35, one end cap for each resilient tension arm 21, having lower engaging surfaces coplanar with the engaging surfaces of the guide arms 17. The lower engaging surface of the end cap 35 has a hole for receiving the elongate planing element 25 and a guide groove 39 for compensating for the thickness of the planing element 25 extending from the hole inwardly along the path defined by the elongate planing element 25. The end cap 35 is so dimensioned as to press fit upon the resilient tension arm 21 so that the planing element 25 is securely clamped between the resilient tension arm 21 and the corresponding end cap 35. Each end cap 35 is further secured to the corresponding resilient tension arm 21 by a dual purpose keeper bolt 36 (see FIGS. 11 and 12) which is threaded through the end cap 35 into the resilient tension arm and serves as a terminal for the positive jumper wire 14E and negative jumper wire 14F.

Figure 6:
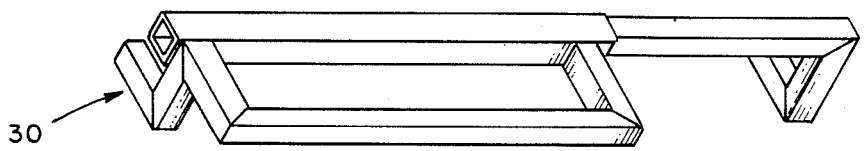
FIG. 6 is a perspective view of the assembled tension frame of the model of the facing device which incorporates an adjustable main frame.
Figure 7:
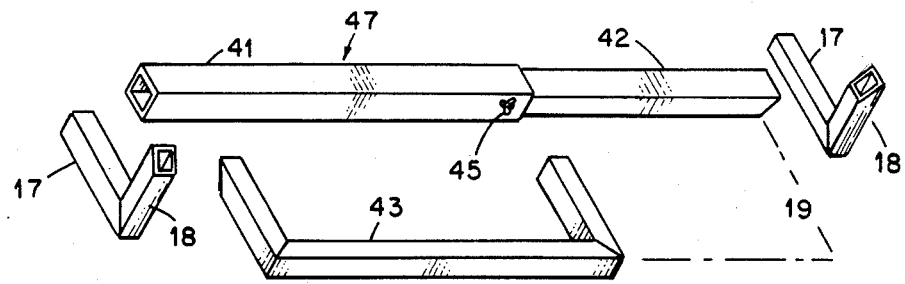
FIG. 7 is a perspective view of the major structures of the adjustable model of the facing device.
Figure 8:
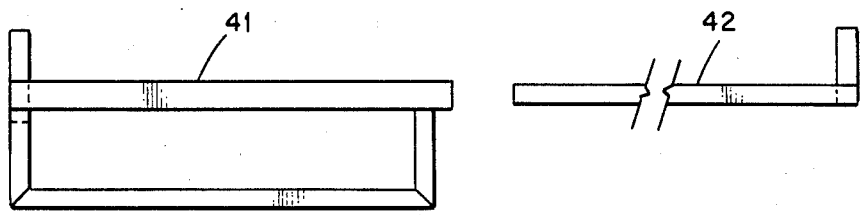
FIG. 8 is a top view of FIG. 6 illustrating the extendibility of the frame of the adjustable model of the facing device.

Referring to FIGS. 6, 7 and 8, an alternate embodiment is shown which incorporates an adjustable main frame 47. The main frame 47 comprises an inner member 42 extendibly mounted inside the outer member 41, a thumb screw 45 for locking the outer member to the inner member to fix the main frame length, and a handle 43 for applying force to the main frame. Preferably the inner member 42, outer member 41, and handle 43 are comprised principally of square aluminum tubing.

Although particular embodiments of the invention have been described in the foregoing detailed description, it will be understood that the invention is capable of numerous rearrangements, modifications, and substitution of parts without departing from the scope of the invention as set forth in the claims below.

What is claimed is:

1. A hand held portable facing device for facing a generally flat heat shearable workpiece comprising;
   an electrical power system;
   an elongate planing element, having a positive and a negative end, so connected to said electrical power system that current supplied by said power system flows through and heats said elongate planing element;
   a tension frame including planar surface means defining a single guide plane for cooperatively engaging the workpiece so that by moving the frame along the workpiece with said guide plane in cooperative engagement with the workpiece, said elongate planing element is guided along the workpiece in operative planing engagement therewith; and
   means for mounting said elongate planing element upon said tension frame so that said elongate planing element is maintained in a taut condition despite variation in length due to temperature change.

2. The hand held portable facing device of claim 1, wherein said tension frame comprises:
   a main frame having first and second ends;
   first and second offset arms, having lower ends, extending from said main frame such that the distance between the lower ends of said offset arms approximates the total main frame length; and
   first and second guide arms, having engaging lower surfaces, extending from said first and second offset arms respectively such that the engaging lower surfaces are coplanar and configured to engage and follow the generally flat workpiece, and such that said main frame is upwardly offset from the plane of the engaging lower surfaces.

3. The hand held portable facing device of claim 2, wherein said main frame comprises:

a frame having inner and outer elongate members extendibly mounted one inside the other such that the total frame length may be adjusted by sliding the elongate members;

at least one handle mounted on said frame for applying force to said frame; and means for locking the inner and outer elongate members together to fix the main frame length as desired.

4. The hand held portable facing device of claim 2, wherein said means for mounting said elongate planing element comprises:

a pair of resilient tension arms, one of which is mounted in each of said first and second guide arms; and means for attaching said elongate planing element to said resilient tension arms, such that said elongate planing element is coplanar with the engaging lower surfaces of said guide arms, and such that constant tension is placed upon said elongate planing element.

5. The hand held portable facing device of claim 3, wherein said means for mounting said planing element comprises:

a pair of resilient tension arms, one of which is mounted in each of said first and second guide arms; and means for attaching said elongate planing element to said resilient tension arms, such that said elongate planing element is coplanar with the engaging lower surfaces of said guide arms, and such that constant tension is placed upon said elongate planing element.

6. The hand held portable facing device of claim 1, wherein said means for mounting said planing element comprises:

a pair of resilient tension arms, one of which is mounted to each end of said tension frame and both of which define workpiece-engaging surface which collectively define a plane; and means for attaching said elongate planing element to said resilient tension arms, such that said elongate planing element is coplanar with the workpiece-engaging surfaces of said tension arms, and such that constant tension is placed upon said elongate planing element.

7. The hand held portable facing device of claim 5, wherein said electrical power system comprises:

an electrical power unit for receiving electrical current from an external source and providing a direct current output of limited amperage;

a cord for conducting electrical current from the external source through said power unit, back to an earth ground;

a safety switch requiring constant positive pressure to remain engaged;

cord means for electrically connecting said frame to earth ground and said safety switch to output from said electrical power unit;

means for electrically connecting said safety switch to the positive end of said elongate planing element; and means for electrically interconnecting the earth ground, said frame, said offset arms, said handle, and the negative end of said elongate planing element.

8. The hand held portable facing device in claim 7, wherein said elongate planing element comprises an elongate wire element stretched between said resilient tension arms.

9. The hand held portable facing device of claim 2, wherein said electrical power system comprises:

an electrical power unit for receiving electrical current from an external source and providing a direct current output of limited amperage;

a cord for conducting electrical current from the external source through said power unit, back to an earth ground;

a safety switch requiring constant positive pressure to remain engaged;

cord means for electrically connecting said main frame to earth ground and said safety switch to output from said electrical power unit;

means for electrically connecting said safety switch to the positive end of said elongate planing element; and means for electrically interconnecting the earth ground, said main frame, said offset arms, and the negative end of said elongate planing element.

10. The hand held portable facing device of claim 1, wherein said electrical power system comprises:

an electrical power unit for receiving electrical current from an external source and providing a direct current output of limited amperage;

a cord for conducting electrical current from the external source through said power unit, back to an earth ground;

a safety switch requiring constant positive pressure to remain engaged;

cord means for electrically connecting said tension frame to earth ground and said safety switch to output from said electrical power unit;

means for electrically connecting said safety switch to the positive end of said elongate planing element; and means for electrically interconnecting the round, said tension frame, and the negative end of said planing element.

* * * * *